Figure 1:
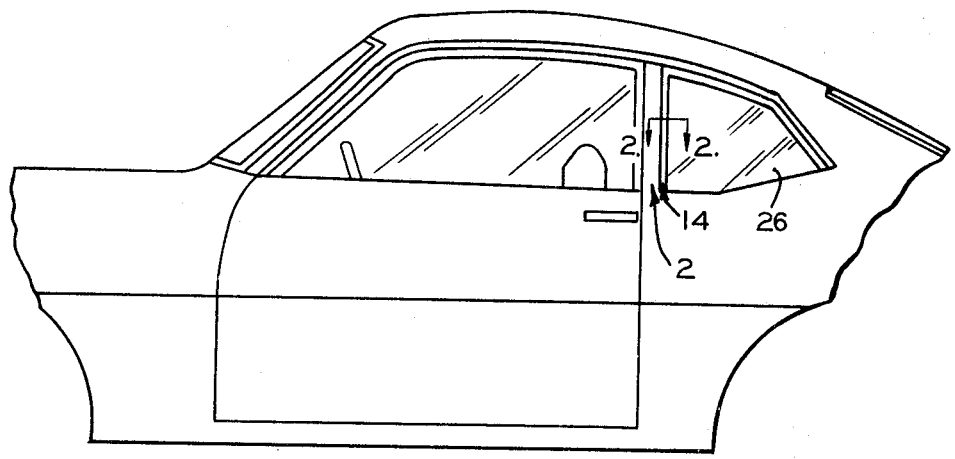

United States Patent

[11] 3,633,316

[72] Inventor John W. Belser
Port Clinton, Ohio
[21] Appl. No. 38,109
[22] Filed May 18, 1970
[45] Patented Jan. 11, 1972
[73] Assignee The Standard Products Company
Cleveland, Ohio

[54] HINGE AND WEATHERSEAL STRUCTURE FOR A GLASS PANEL
5 Claims, 2 Drawing Figs.

[52] U.S. Cl.................................................. 49/384,
16/171, 49/489
[51] Int. Cl............................................... E05d 5/16
[50] Field of Search........................................ 49/479,
483, 488, 489, 384, 381, 399, 383, 485, 475;
16/171, 150; 160/235, 231 R

[56] References Cited
UNITED STATES PATENTS
2,405,460 8/1946 Smith............................ 49/488

2,894,295 7/1959 Singleton..................... 49/384
3,087,193 4/1963 Eskridge et al. ............. 16/171 X

*Primary Examiner*—Thomas F. Callaghan
*Assistant Examiner*—Philip C. Kannan
*Attorney*—Meyer, Tilberry and Body

ABSTRACT: A glass panel is hingedly mounted for swinging movement about a structure which serves as a hinge and also as a weatherstrip. The glass panel has a substantially linear edge to which is bonded a cylindrical element, the edge of the glass panel extending into the cylindrical element for a substantial portion of a diameter. A resilient element which serves as a weatherstrip is mounted in any suitable manner on the frame, and is provided with a socket which presents a circular cross section. The cylindrical element on the linear edge of the glass panel fits into the socket thus provided in the weatherstrip, and the glass panel is thus swingable relative to the weatherstrip and frame about the axis of the cylindrical element.

PATENTED JAN 11 1972   3,633,316

INVENTOR.
JOHN W. BELSER
BY
Meyer, Tilberry & Body
ATTORNEYS.

HINGE AND WEATHERSEAL STRUCTURE FOR A GLASS PANEL

BACKGROUND OF THE INVENTION

1. Field of the Invention

Industrial uses of glass have expanded greatly in recent years. Thus, there have been greatly increased uses of glass for doors of public buildings, apartment buildings, and even private residences. Moreover, in the automobile industry, there has been a marked increase in the use of glass over the last few years, with the result that the upper portion of an automobile body today displays a glass area which would have been considered fantastic a few years ago. These increased uses of glass have presented some problems, especially where it is desired to make the glass panel movable, as for example when glass is used for doors and windows. Although many automobile windows have conventionally been of the sliding type, such windows need not be thus limited in their means of movement. One of the ever-present problems in mounting a glass panel to pivot about a hinge is the problem of providing a hinge which is easily fastened to a glass panel not enclosed in a metal frame. Such a hinge must of necessity be secured in some suitable manner to the glass, and securing means which are limited to bolting to the glass are undesirable because boltholes necessarily weaken the glass and may lead to breakage of the panel with possible accidental injury to persons coming into contact with such broken panels. A possible alternative is to secure one of the hinge members directly to the glass, but this solution also presents problems when it comes to the means for providing a reliable connection of the hinge member with the glass, coupled with the requirement in so many applications of a good weatherseal at the hinge. All of the foregoing problems are aggravated by structures in which a heavy glass panel is suspended from a horizontal hinge disposed at the top of the panel, or when such a heavy glass panel must be mounted to pivot about a vertical hinge. The problem in heavy glass panels involves a secure and reliable support of the glass at the hinge.

2. Description of the Prior Art

The prior art in this area is adverted to in the foregoing paragraph and involves rather cumbersome metallic hinges bolted or riveted or clamped in some manner to a glass panel, with the attendant risk of cracking the glass in the assembly of the glass with the hinge member.

SUMMARY OF THE INVENTION

It is an object of this invention to provide a combination hinge and weatherseal for an easily damaged panel that must be secured so as to be movable between open and closed positions. It is another object to provide a hinge for a relatively heavy and somewhat fragile panel, the hinge to support the panel from a vertical axis or to depend from a horizontal axis. Still another object is to provide a hinged support exposed to inclement weather which will function in adverse weather and be substantially wind and water tight. Other objects will be apparent from the description and drawings.

A cylindrical bead of rubber is molded along a linear edge of the glass panel which is to be hingedly mounted. The linear edge extends into the cylindrical bead a substantial distance, preferably something more than the length of a radius. The dense rubber section which serves both as a weatherseal and as a socket and seal for the linear edge of the glass panel is provided at the edge of the opening which is to be occupied by the panel in the closed position. The weatherseal is provided with a socket which has a circular cross section, with the result that the socket has a slot through which the cylindrical bead on the glass panel must be forced so that the cylindrical bead can occupy the socket space in the weatherseal.

Figure 2:
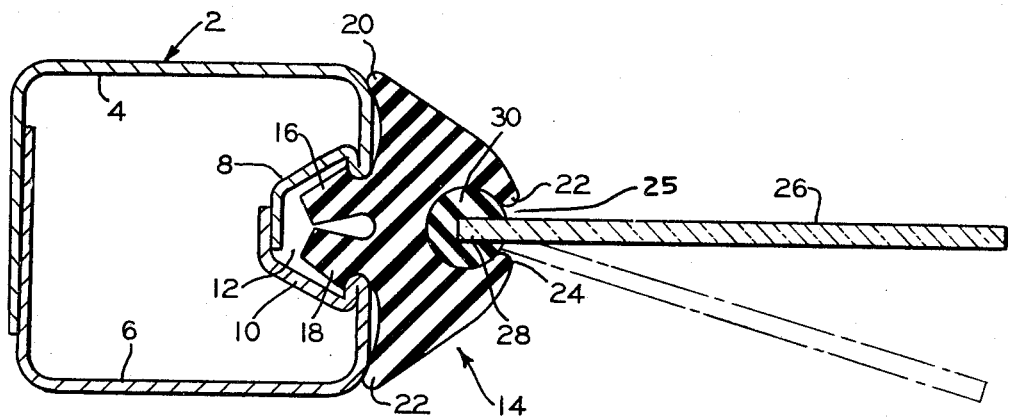

In the drawings:

FIG. 1 shows a portion of an automobile body in which the rear window is shown as hingedly mounted according to this invention; and FIG. 2 is a section through a transparent panel provided with the hinge structure of this invention, being a section substantially on line 2—2 of FIG. 1.

DESCRIPTION

The opening in whatever structure is envisioned will be provided with suitable structure on which one member of the hinge can be mounted. Thus, in the embodiment shown, a box section 2 is made of two telescoping channel members 4 and 6. One of the faces of the box section is recessed by providing inward flanges 8 and 10 in the channels 4 and 6 respectively, the two flanges 8 and 10 cooperating to form a groove portion or trough 12 in one face of the box section.

A weatherseal 14 is shown as secured to a face of the frame member or box section 2. In the embodiment shown, the weatherseal 14 is of a type as is usually referred to as a weatherstrip, being made of extruded or molded dense material such as rubber or any similar substance having sufficient resilience that it can be displaced by the application of considerable force in the assembly of the hinge, and yet having sufficient strength to hold the hinge in its assembled condition. A cross section of the weatherseal 14 somewhat resembles as isosceles triangle with two flanges extending out of the base and with a groove at the vertex of the triangle.

More specifically, the body of the weatherseal has provided at the base of the triangle a pair of parallel flanges 16 and 18 which in their free condition extend substantially perpendicularly from the surface of the base, but which are adapted to be deformed toward each other as shown in the drawing to be pressed or forced into the trough 12 in the appropriate face of the frame member 2. The rubber or similar material of which the weatherseal 14 is made is stiff enough so that the flanges 16 and 18 will tightly engage the sides of the trough or groove 12, and the edges 20 and 22 of the isosceles triangle are tightly engaged with two corners of the box section 2 in order to further enhance the weathersealing characteristics of the assembly.

The isosceles triangle structure shown in FIG. 1 is provided with a socket at its vertex which consists of a groove having a substantially circular cross section. The groove is provided with opposed lips 22 and 24 which are spaced apart by a distance substantially less than the diameter of the circular cavity which provides the socket, but greater than the thickness of the glass. The opposed, spaced lips thus provide a slot 25 in the socket, the slot being parallel to the axis of the cylindrical socket and open toward the framed space for which panel 26 is a closure.

A transparent panel 26 is shown in FIG. 1 as providing the closure for the door or window opening in the embodiment illustrated. Panel 26 will usually be a high-quality, tempered-glass panel having, for glass, substantial strength and whatever shape may suit the requirements of the remainder of the structure. However, in the circumstances, the glass panel will be provided with a substantially linear edge so as to provide a pivot axis for the desired hinge action. In the embodiment shown in FIG. 2, panel 26 is illustrated as a substantially plane panel of glass having a linear edge 28 to which there is bonded a cylindrical bead 30. A suitable material for the bead 30 has been formed from an acrylonitrile rubber epoxy compound. Such a compound, when vulcanized while in contact with the edge 28 of the glass, exhibits excellent adhesion to the glass. It will also be noted that the edge 28 extends into the cylindrical bead 30 a substantial portion of a diameter of the cylindrical bead. As illustrated in FIG. 2, the edge 28 extends into the bead 30 by something more than the length of a radius of the cylinder.

In order to provide a high degree of weathersealing characteristics, the cylindrical bead 30 and the weatherstrip body 14 are preferably so formed that, in their unassembled and free state, the cylindrical bead 30 is somewhat larger than the cavity or socket with which it cooperates. The extent of such dimensional "interference" will vary depending upon how tight the weatherseal needs to be and on how heavy the glass panel is, along with a number of other factors, such as the angle to which the panel 26 must swing between open and closed positions; other considerations entering into the design will be apparent to those skilled in the art.

I claim:

1. A hinge to permit relative swinging movement of two members one of which is a sheet of frangible nonmetallic material having a linear edge and the other of which is a weatherseal element having a socket of circular cross section, the invention comprising said weatherseal element being of a resilient nonmetallic substance and said socket having opposed resilient lips providing a linear slot opening thereinto, and a cylindrical element bonded to said linear edge and adapted to be introduced into said socket through said slot for pivotal movement in said socket.

2. A hinged panel structure comprising a metal frame element, a resilient nonmetallic weatherseal in engagement with the frame element and provided with a socket having a substantially circular cross section and opposed resilient lips providing a linear slot opening thereinto, a glass sheet having a linear edge, and a cylindrical element bonded to the sheet at the linear edge and adapted to be introduced into said socket through said slot to pivotally engage said socket.

3. A structure as in claim 2, wherein the cylindrical element is slotted along a substantial portion of a diameter and said linear edge is received in the slotted portion.

4. An automobile window comprising a framed opening having a side provided with a weathersealing socket-forming member, the socket being substantially circular in cross section and having opposed lips providing a linear slot which opens toward the framed opening, a resilient cylindrical member oscillatable in the socket in a weathersealing relationship thereto and having a slot, and a closure panel having a linear edge in bonded engagement with the cylindrical member in the slot of the cylindrical member and extending through the slot of the socket between said lips.

5. An automobile window comprising a framed opening having a frame edge provided with a trough, a weathersealing socket-forming member engaging the frame edge at the trough, the socket being substantially circular in cross section and having opposed lips providing a linear slot which opens toward the framed opening, a resilient cylindrical member oscillatable in the socket in a weathersealing relationship thereto and having a slot, and a closure panel having a linear edge in bonded engagement with the cylindrical member in the slot of the cylindrical member and extending through the slot of the socket between said lips.

* * * * *